(12) United States Patent
Kandapallil et al.

(10) Patent No.: US 11,401,443 B2
(45) Date of Patent: Aug. 2, 2022

(54) ADHESION-REGULATING AGENTS AND METHODS FOR TUNING ADHESION STRENGTH OF ACRYLIC ADHESIVES BY SUBSTRATE MODIFICATION

(71) Applicant: The Boeing Company, Chicago, IL (US)

(72) Inventors: Binil Kandapallil, Summerville, SC (US); Siji Thomas, Summerville, SC (US); Isbelia Cardona, Mount Pleasant, SC (US); Semih Sendur, Charleston, SC (US)

(73) Assignee: The Boeing Company, Chicago, IL (US)

( * ) Notice: Subject to any disclaimer, the term of this patent is extended or adjusted under 35 U.S.C. 154(b) by 356 days.

(21) Appl. No.: 16/803,207

(22) Filed: Feb. 27, 2020

(65) Prior Publication Data

US 2020/0190363 A1  Jun. 18, 2020

Related U.S. Application Data

(63) Continuation of application No. 15/711,444, filed on Sep. 21, 2017, now abandoned.

(51) Int. Cl.
| | |
|---|---|
| *C09J 5/02* | (2006.01) |
| *B32B 37/12* | (2006.01) |
| *B64D 11/00* | (2006.01) |
| *E04F 15/02* | (2006.01) |
| *B32B 7/12* | (2006.01) |
| *B29C 63/00* | (2006.01) |
| *B29C 63/02* | (2006.01) |
| *B60N 3/04* | (2006.01) |

(52) U.S. Cl.
CPC ............ *C09J 5/02* (2013.01); *B29C 63/0047* (2013.01); *B29C 63/02* (2013.01); *B32B 7/12* (2013.01); *B32B 37/12* (2013.01); *B60N 3/046* (2013.01); *B64D 11/00* (2013.01); *E04F 15/02155* (2013.01); *C09J 2301/504* (2020.08); *C09J 2400/163* (2013.01); *C09J 2400/166* (2013.01); *C09J 2400/226* (2013.01); *C09J 2400/228* (2013.01); *C09J 2433/008* (2013.01)

(58) Field of Classification Search
CPC .. C09J 5/02; B60N 3/04–048; B32B 7/12–14; B32B 37/12; B32B 37/1284; B32B 37/1292; B32B 2037/1269; B32B 2037/1276; E04F 15/0215–02155; B64C 1/18

See application file for complete search history.

(56) References Cited

U.S. PATENT DOCUMENTS

| | | | |
|---|---|---|---|
| 2,768,909 A * | 10/1956 | Haslam | C09J 7/10 |
| | | | 156/332 |
| 3,769,254 A | 10/1973 | Anderson et al. | |
| 4,005,247 A | 1/1977 | Graham | |
| 4,166,876 A | 9/1979 | Chiba et al. | |
| 4,816,288 A | 3/1989 | Rukavina et al. | |
| 6,670,417 B2 | 12/2003 | Foreman et al. | |
| 6,834,159 B1 * | 12/2004 | Schramm | B60H 1/2227 |
| | | | 244/129.1 |
| 2004/0234793 A1 | 11/2004 | Dietz et al. | |
| 2006/0059825 A1 * | 3/2006 | Wiercinski | C09J 7/38 |
| | | | 52/506.01 |
| 2006/0194705 A1 * | 8/2006 | Staggs | C11D 7/10 |
| | | | 510/100 |
| 2008/0050598 A1 * | 2/2008 | Bateman | C08J 7/12 |
| | | | 428/537.1 |
| 2017/0081567 A1 | 3/2017 | Ha et al. | |

FOREIGN PATENT DOCUMENTS

CN    102491781 A    6/2012

OTHER PUBLICATIONS

Dorf Ketal Tyzor TPT, "Organic Titante", Dorf Ketal Chemicals, Mr. Coats, Stafford TX, USA (Jul. 2010), pp. 1-2.
Shell Chemicals, "VM&P Naphtha HT", Technical Datasheet, Mar. 2016, pp. 1-3.
Butyl Titanate Tetramer Information, retrieved from the Internet Jul. 17, 2019, from http://www.chemsrc.com/en/cas/70799-68-7 1141494.html, pp. 1-4.

* cited by examiner

*Primary Examiner* — Stephen E Rieth
(74) *Attorney, Agent, or Firm* — Coats & Bennett, PLLC

(57) ABSTRACT

Adhesion-regulating agents for enhancing the adhesion values of acrylic adhesives, and methods of using adhesion-regulating agents for treating a removable flooring substrate surface for tuning the adhesion of the flooring substrate surface to objects comprising an acrylic adhesive are disclosed.

20 Claims, 7 Drawing Sheets

ADHESION-REGULATING AGENTS AND METHODS FOR TUNING ADHESION STRENGTH OF ACRYLIC ADHESIVES BY SUBSTRATE MODIFICATION

RELATED APPLICATIONS

This application is a Continuation Application of U.S. Ser. No. 15/711,444 filed Sep. 21, 2017, the entire contents of which are incorporated by reference herein.

TECHNOLOGICAL FIELD

Aspects of the present disclosure relate generally to methods for modifying the known adherence characteristics of an adhesive compound, and adhesive compounds so modified. More specifically, aspects of the present disclosure are directed to methods for modifying the known adherence characteristics of acrylic pressure sensitive adhesive compounds, and acrylic pressure sensitive adhesives compounds so modified.

BACKGROUND

For many applications, the adherence of parts, components, etc., to substrates must predictably retain the parts, components, etc., in place, for example with the assistance of an adhesive. However, certain applications require that parts eventually be removed or replaced, requiring the removal of the part from a substrate. As a result, when a part has a finite life cycle, or a part otherwise has a planned removal and/or is subject to a replacement or maintenance schedule, the selection of an adhesive that will release the part from the substrate without significant damage to a substrate surface becomes an important factor.

In the flooring field, floor coverings in the form of floor mats or floor tiles often comprise an amount of adhesive, or adhesive is applied to the substrate/tile interface, to retain the floor covering in place on the underlying floor covered by the floor covering. Adequate adherence of the flooring is required to maintain the flooring in place and ensure against separation of the floor covering from the underlying floor, often resulting in the floor covering becoming dislodged completely, or becoming partially dislodged, such as, due to "bubbling" or other irregularities evidencing an unwanted at least partial release of the floor covering from the underlying floor to which the floor covering is adhered.

SUMMARY

Aspects of the present disclosure are directed to "tuning" (e.g. predictably modifying or adjusting) the adhesive strength of an adhesive compound to allow for an adhered material layer or adhered component comprising the modified adhesive compound to remain in a desired location, substantially completely adhered to a substrate, while also allowing the adhered material layer or adhered component to be removable, if desired, from a substrate to which the material layer or component is adhered without damaging the substrate or the material layer/component. The term "substantially completely adhered", at least in the context of a material layer adhered to a substrate surface, refers herein to adherence of the material layer (via the adhesive provided to the surface of the material layer) to a substrate surface that has been treated according to aspects of the present disclosure, such that air pockets or areas of "bubbling" do not form in areas of the material layer-to-substrate surface interface; a condition that would evidence an unwanted release of adhesion between the material layer and the substrate surface.

A further aspect is directed to a method of installing a material layer onto a substrate surface, with the method comprising applying an adhesion-regulating agent to a substrate surface to form an adhesion-regulated substrate surface, with the adhesion-regulating agent comprising at least one of a polar-aprotic or a polar-protic solvent and at least one titanate. A material layer is placed onto the adhesion-regulated substrate surface with the material layer comprising an adhesive layer, with the adhesive layer oriented proximate to the adhesion-regulated substrate surface. The material layer maintains a degree of adhesion with the adhesion-regulated substrate surface, with the degree of adhesion ranging from between about 1.0 pound per inch of width to about 4 pounds per inch of width, and more preferably ranging from between about 1.0 pound per inch of width to about 2 pounds per inch of width.

Another aspect comprises increasing an adhesion value of the adhesive adhered to the material, and therefore the adhesion value of the material layer itself, to the adhesion-regulated substrate surface by an amount of at least from about 10% to about 25% as compared with the adhesion value of a material layer to a substrate surface not treated with the adhesion-regulating agent.

In another aspect, the polar-aprotic solvent comprises at least one ketone-containing solvent.

In a further aspect, the polar-protic solvent comprises an alcohol, or an alcohol and naphtha mixture, preferably in an alcohol:naphtha ratio of about 1:1.

A further aspect is directed to an adhesion-regulating agent comprising a polar-aprotic solvent or a polar-protic solvent in an amount ranging from about 95% by volume to about 99% by volume, and at least one titanate in an amount ranging from about 0.05 to about 0.5% by volume.

Another aspect is directed to a flooring assembly comprising a floor substrate, with the floor substrate having a floor substrate surface, and with the floor substrate surface treated with an adhesion-regulating agent to form an adhesion-regulated floor substrate surface. The adhesion-regulating agent comprises at least one of a polar-aprotic or a polar-protic solvent and at least one titanate. A flooring material comprising a pressure sensitive adhesive layer with the pressure sensitive adhesive layer is oriented proximate to, or otherwise placed onto the adhesion-regulated floor substrate surface. The flooring material maintains a degree of adhesion with the adhesion-regulated floor substrate surface, with the degree of adhesion ranging between about 1.0 pound per inch of width to about 4 pounds per inch of width, and more preferably ranging from between about 1.0 pound per inch of width to about 2 pounds per inch of width A further aspect is directed to an object comprising a flooring assembly, with the flooring assembly comprising a floor substrate, with the floor substrate having a floor substrate surface, and with the floor substrate surface treated with an adhesion-regulating agent. The adhesion-regulating agent comprises at least one of a polar-aprotic or a polar-protic solvent and at least one titanate. The flooring assembly comprises a flooring material, with the flooring material comprising a pressure sensitive adhesive layer, and with the pressure sensitive adhesive layer oriented proximate to the adhesion-regulated substrate surface. The flooring material maintains a degree of adhesion with the adhesion-regulated floor substrate surface, with the degree of adhesion ranging between from about 1.0 pound per inch of width to about 4 pounds per inch of width, and more preferably ranging from between from about 1.0 pound per inch of width to about 2 pounds per inch of width.

In another aspect, the object is a vehicle including a manned aircraft, an unmanned aircraft, a manned spacecraft, an unmanned spacecraft, a manned rotorcraft, an unmanned rotorcraft, a satellite, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

BRIEF DESCRIPTION OF THE DRAWINGS

Figure 1A:
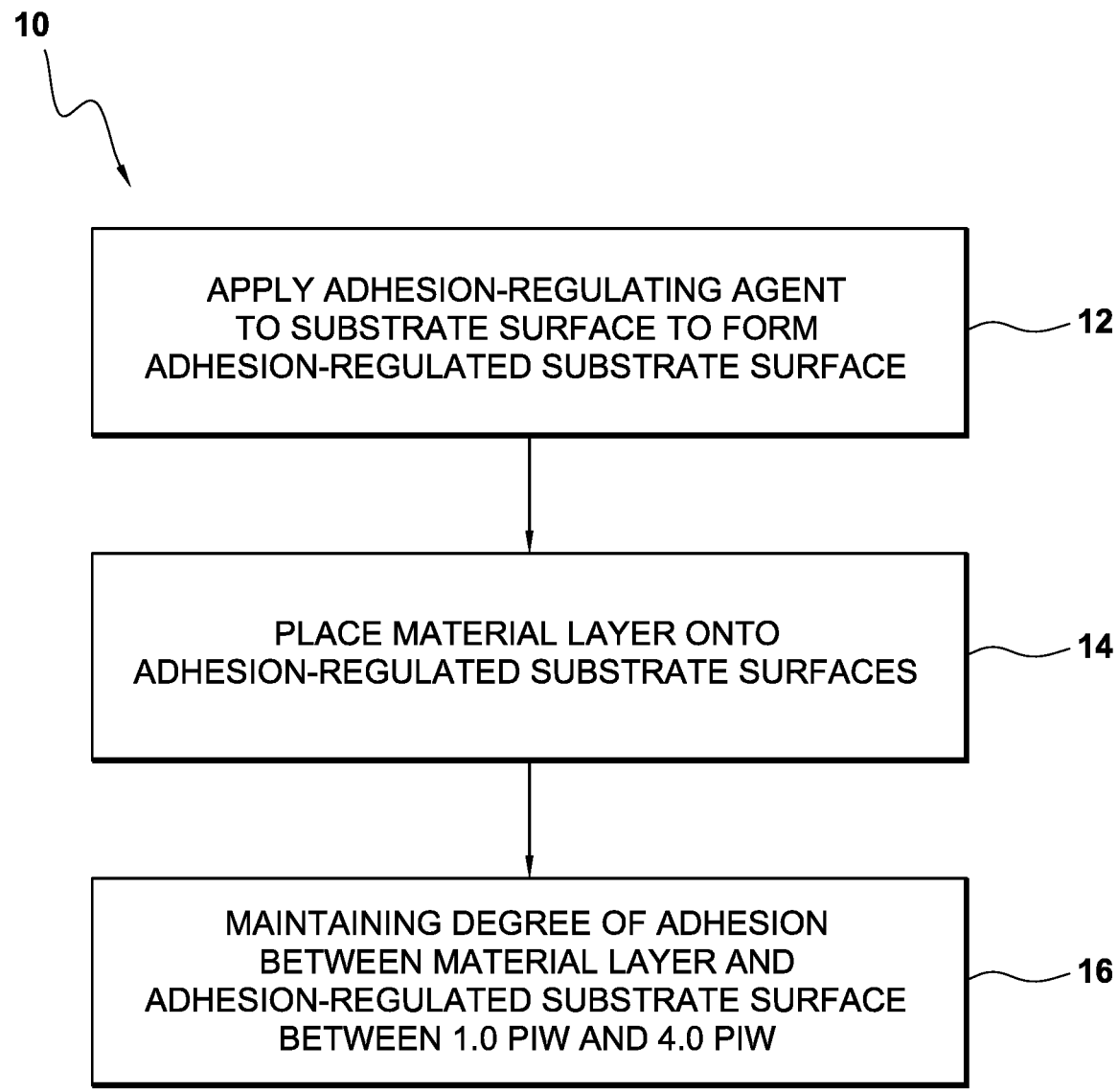
Figure 1B:
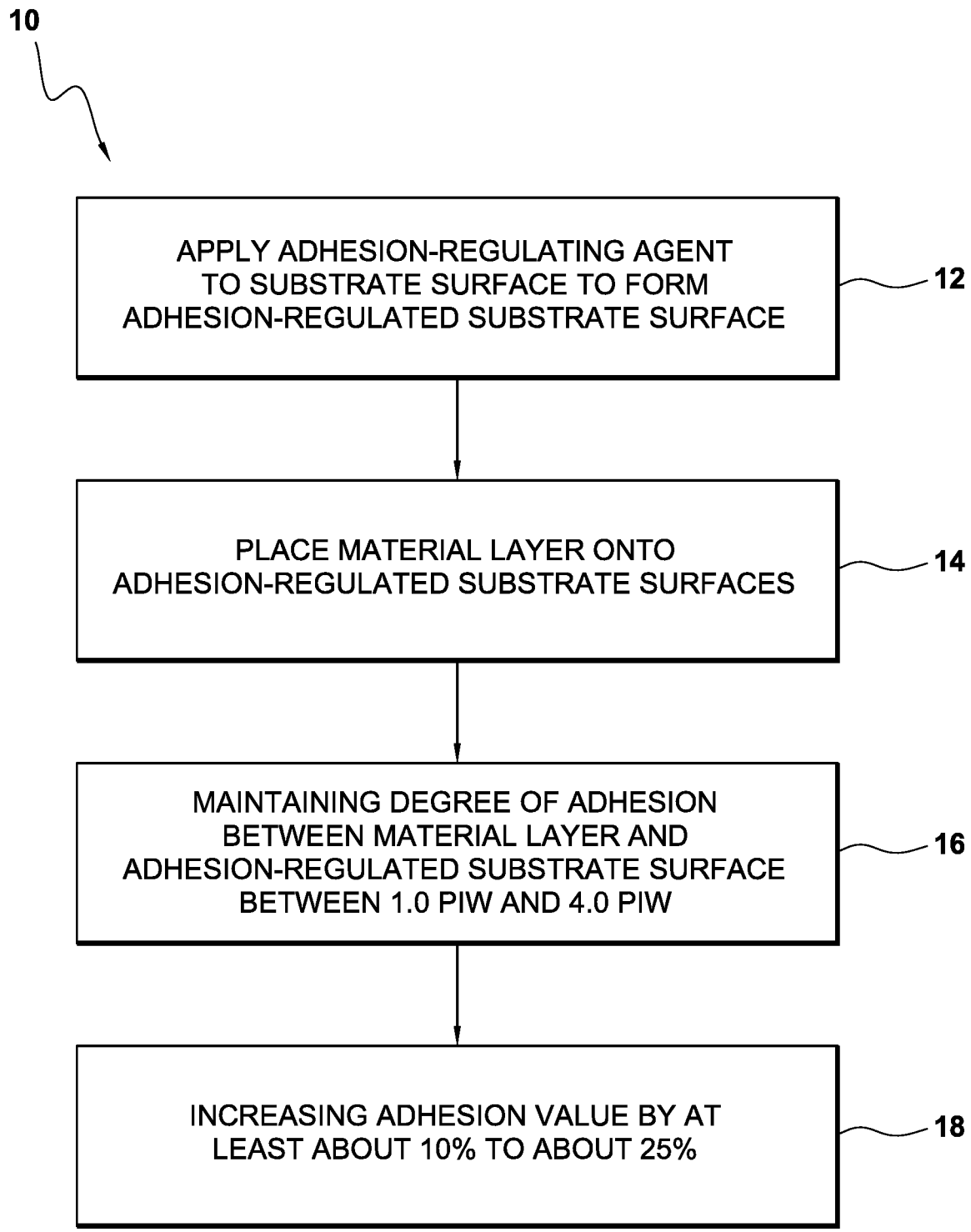
Figure 2:
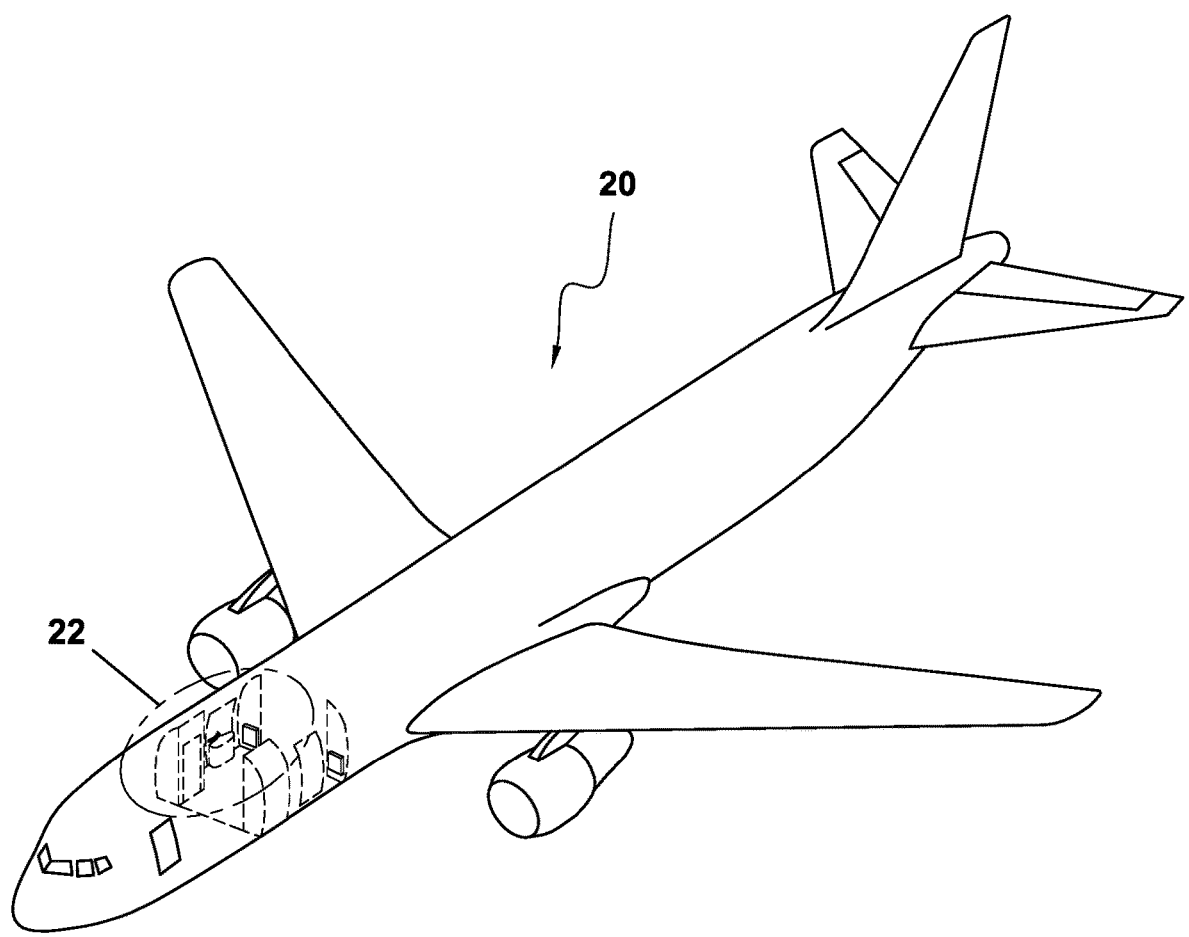
Figure 3:
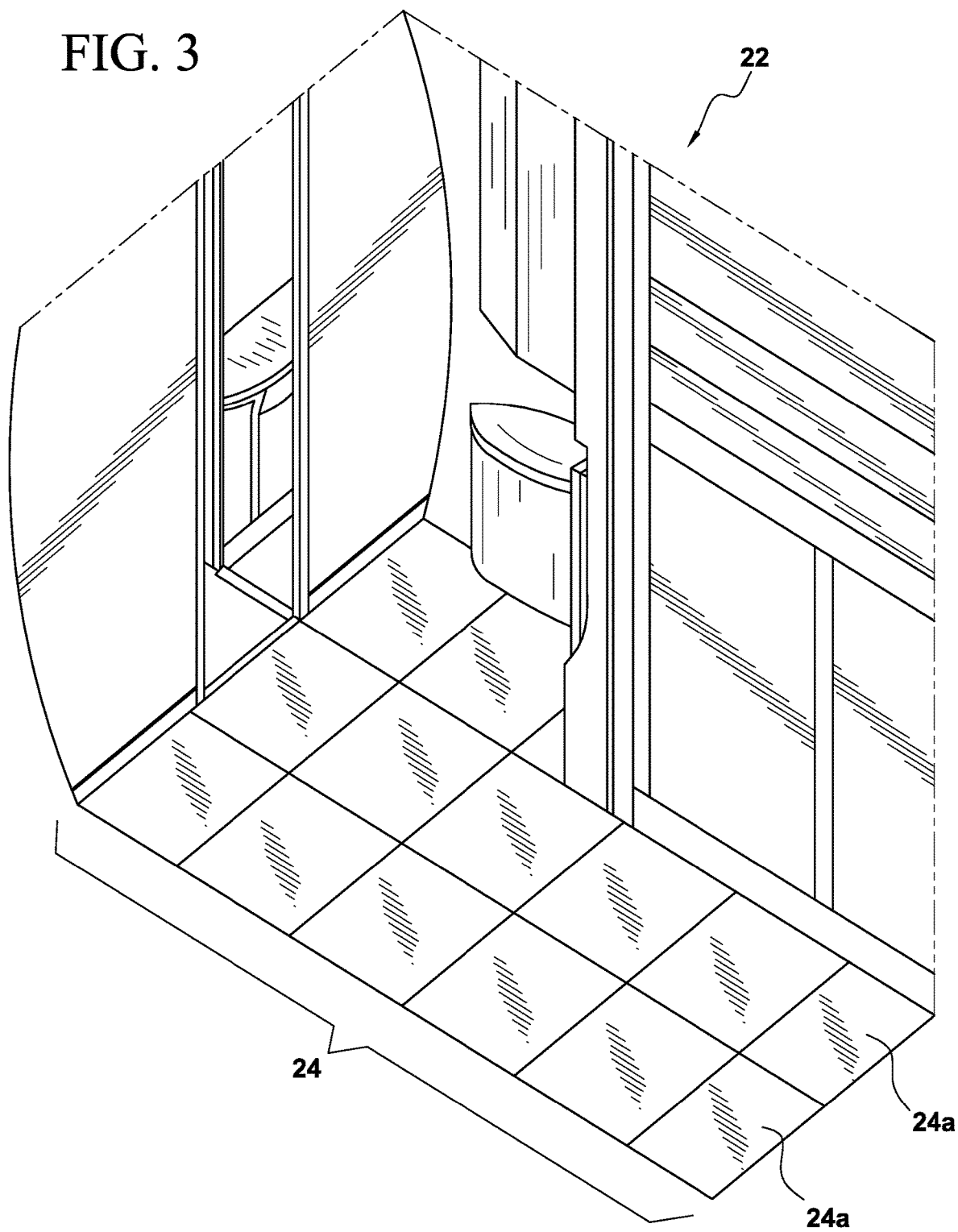
Figure 4:
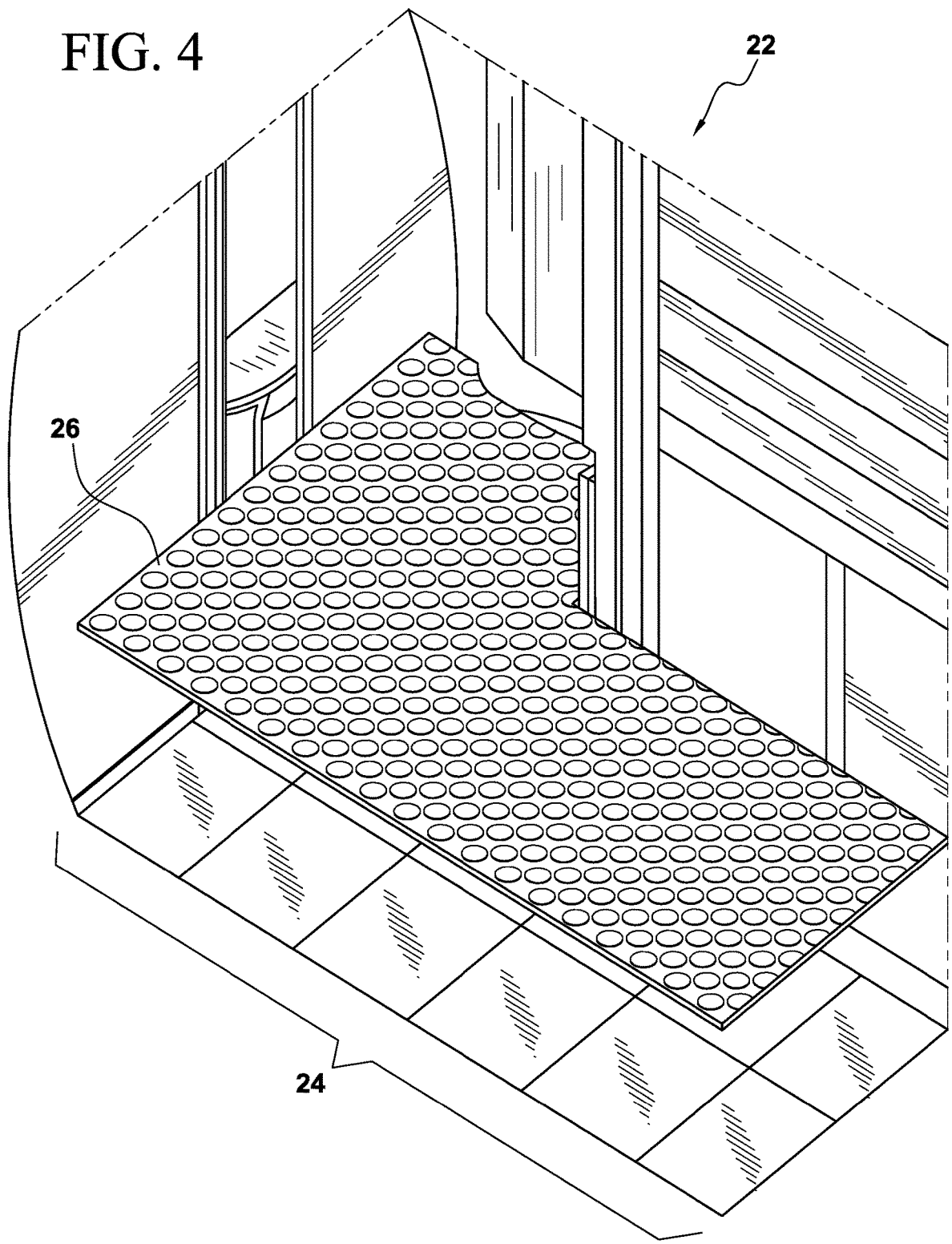
Figure 5:
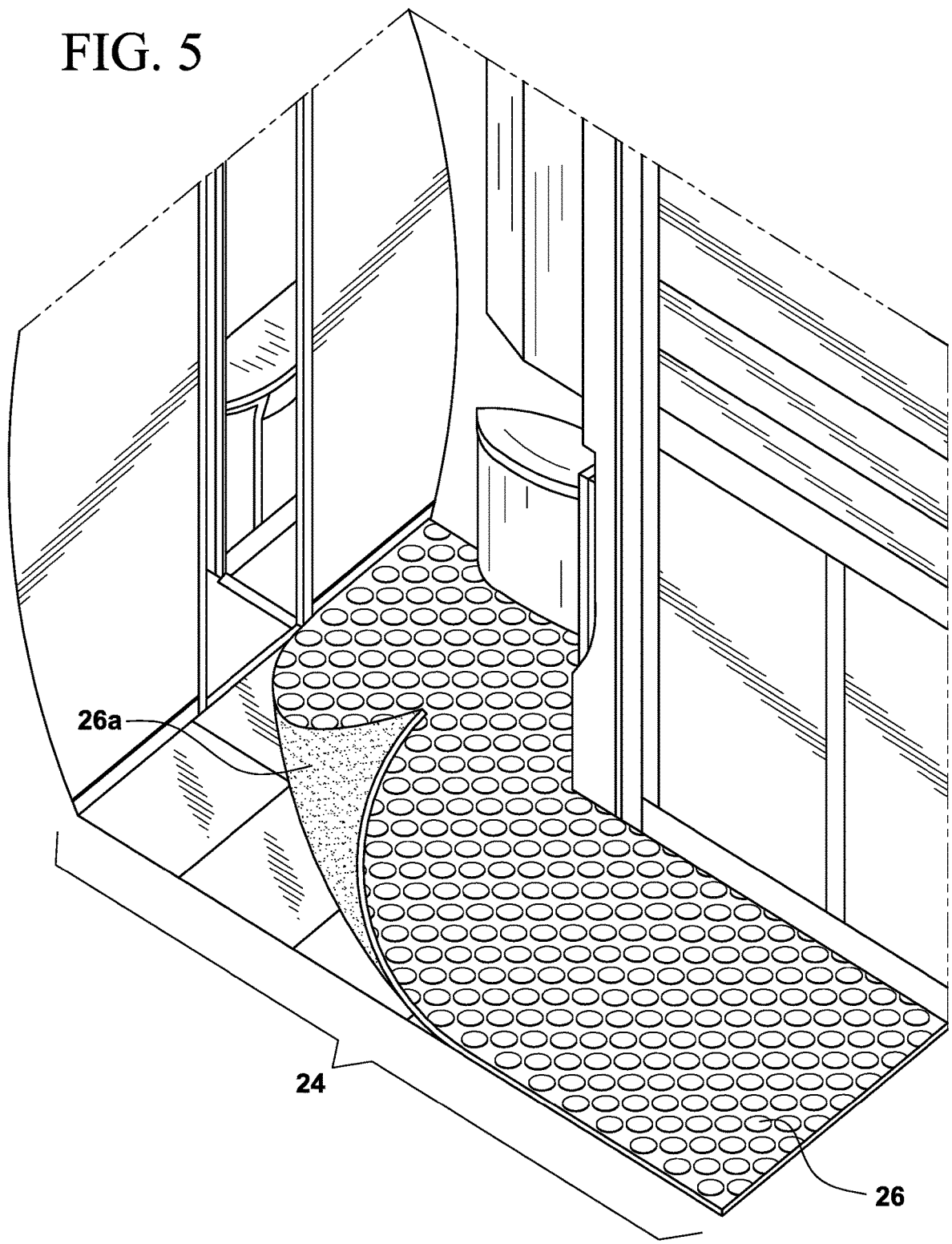
Figure 6:
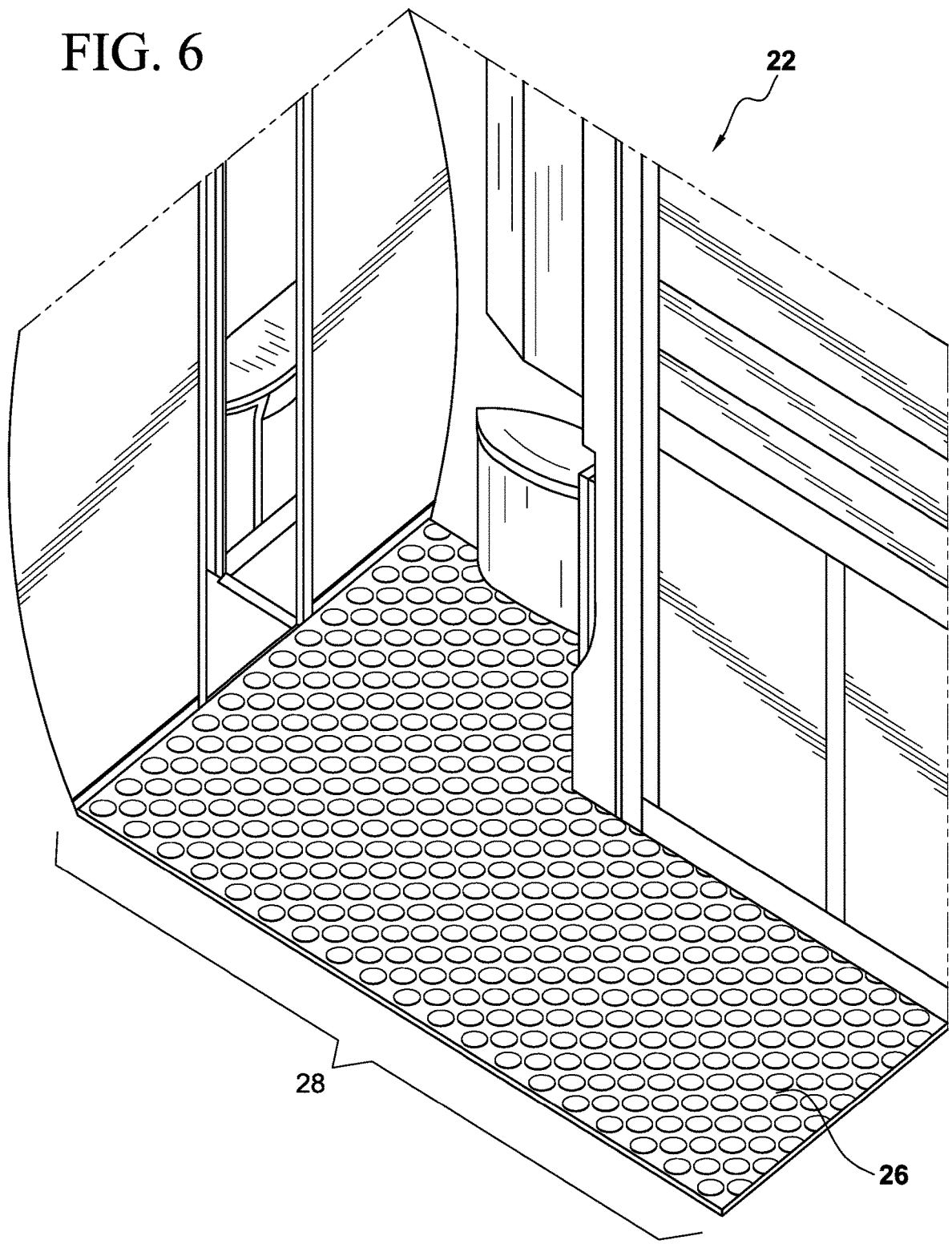

Having thus described variations of the disclosure in general terms, reference will now be made to the accompanying drawings, which are not necessarily drawn to scale, and wherein:

FIG. 1A is a flowchart outlining a method according to aspects of the present disclosure, and according to aspects shown in FIGS. 2-6;

FIG. 1B is a flowchart outlining a method according to aspects of the present disclosure, and according to aspects shown in FIGS. 2-6;

FIG. 2 is an illustration of an aircraft comprising an area having a flooring assembly according to aspects of the present disclosure;

FIG. 3 is an illustration of a galley area in the vehicle of FIG. 2, comprising a floor to be treated according to aspects of the present disclosure;

FIG. 4 is an illustration of the galley area shown in FIGS. 2 and 3 with a material layer to be positioned on a floor treated according to aspects of the present disclosure;

FIG. 5 is an illustration of the galley area shown in FIGS. 2, 3 and 4 with the material layer being placed into position on the floor to form the flooring assembly; and FIG. 6 is an illustration of the completed flooring assembly assembled into the galley area shown in FIGS. 2-5.

The features, functions and advantages that have been discussed can be achieved independently in various aspects or may be combined in other aspects, further details of which can be seen with reference to the following description and the drawings.

DETAILED DESCRIPTION

It has now been discovered that by treating a substrate surface with an adhesion-regulating agent, the adhesion characteristics of a pressure-sensitive adhesive including an acrylic pressure-sensitive adhesive can successfully be tuned to increase an adhesion value of the adhesive by an amount of at least 10% to about 25% (e.g., from the adhesion value of an untreated adhesive) while maintaining a degree of adhesion ranging from between about 1.0 pound per inch of width to about 4.0 pounds per inch of width, and more preferably while maintaining a degree of adhesion ranging from about 1.0 pounds or less per inch of width to about 2.0 pound per inch of width.

According to an aspect of the present disclosure, various substrate surfaces may be treated with the adhesion-regulating agents disclosed herein. Contemplated substrate surfaces include metal, metal-alloy and non-metal substrate surfaces. The contemplated surface may further be coated such as, for example, coated with a polyurethane tape. Contemplated metal surfaces include metal surfaces comprising at least one of an aluminum, an aluminum alloy, a titanium, or a titanium alloy. Contemplated non-metal surfaces include non-metal surfaces comprising fiber-reinforced plastics, including carbon fiber-reinforced plastics (CFRPs). Further, the contemplated substrate surfaces can be used as floor substrate surfaces, such as those used in a flooring assembly.

Pressure-sensitive adhesives, contemplated for use in aspects of the present disclosure that have now been shown to have their adhesion regulated or tuned to a predetermined degree, comprise viscoelastic polymers such as, for example, acrylates, rubber, silicone, etc. Exemplary acrylates (e.g. acrylic-containing compounds) include, for example and without limitation, acrylate monomers such as 2-ethylhexyl acrylate, n-butyl acrylate, methyl acrylate, and t-butyl methacrylate. Such pressure sensitive adhesives may further comprise a tackifier. Suitable tackifiers include, for example and without limitation, low molecular weight resins, hydrogenated resins, terpene-phenol resins, etc. (e.g., PS100 PSA, manufactured by Capitol Adhesives, Dalton Ga.).

Without being bound to any particular theory, the contemplated pressure sensitive adhesives used in conjunction with aspects of the present disclosure are believed to form a weak bond with the substrate, such as, for example a Van der Waals type molecular interaction. Such weaker bonding is unlike structural adhesives where a permanent (primarily a covalent) bond is formed between the adhesive and substrate.

In one aspect, an organic solvent, preferably a polar-aprotic solvent such as a ketone-containing compound is fortified, or doped with, an amount of a titanate to tune, to a predetermined degree, the adhesion characteristics of an adhesive to a substrate surface. The term "titanate" is defined as any salt or ester of a titanic acid. Preferred ketone-containing (e.g., ketonic) solvents include, for example, methyl ethyl ketone, methyl n-propyl ketone, methyl isobutyl ketone and acetone.

Without being bound to any particular theory, polar-aprotic solvents have dielectric constants greater than 20 and large dipole moments, but do not participate in hydrogen bonding and are therefore understood to lack O—H or N—H bonds. The high polarity of polar-aprotic solvents allows them to dissolve charged species such as various anions used as nucleophiles (e.g. CH(—), HO(—), etc.).

In another aspect, an organic solvent, preferably a polar-protic solvent such as an alcohol (e.g., isopropyl alcohol (IPA), etc.) is fortified, or doped with, an amount of a titanate to tune to a predetermined degree the adhesion characteristics of an adhesive to a substrate surface. Without being bound to any particular theory, polar-protic solvents are understood to be solvents that have O—H or N—H bonds that can participate in hydrogen bonding and can serve as a source of protons (H+).

The adhesion-regulating agents contemplated according to aspects of the present disclosure comprise a polar-aprotic solvent or a polar-protic solvent in an amount ranging from about 95% to about 99% by volume with at least one titanate in an amount ranging from about 0.1% to about 0.5% by volume, more preferably from about 0.15% to about 0.3% by volume.

Preferred titanates include at least one of: titanium (IV) (triethanolaminato)isopropoxide; titanium bis(triethanolamine)diisopropoxide; titanium (IV) butoxide polymer; titanium (IV) butoxide; titanium (IV) oxyacetylacetonate; titanium (IV) bis(ammoniumlactate)dihydroxide; oxobis(2, 2,6,6-tetramethyl-3,5-heptanedianato) titanium(IV); titanium (IV diisopropoxidebis(2,2,6,6-tetramethyl-3,5-heptanedionate); titanium (IV) diisopropoxide bis (acetylacetonate); titanium (IV) tert-butoxide; titanium tetraisopropoxide; or titanium (IV) 2-ethylhexyloxide, or mixtures thereof.

FIGS. 1A and 1B are flowcharts illustrating aspects of the present disclosure. As shown in FIGS. 1A and 1B, a method 10 includes the steps of applying 12 an adhesion-regulating agent to a substrate surface to for an adhesion-regulated substrate surface, followed by placing 14 a material layer onto the adhesion-regulated substrate surface. This step 14, according to FIG. 1 is followed by maintaining 16 a degree of adhesion between a material layer and the adhesion-regulated substrate surface between about 1.0 pounds per inch of width (PIW) and about 4.0 PIW. In FIG. 1B the methods shown in FIG. 1A are presented with the additional step of increasing 18 an adhesion value of the adhesive applied to the material layer, and therefore increasing the adhesion value of the material layer itself to the adhesion-regulated substrate by a measured percent increase of adhesion ranging from about 10% to about 25%.

According to aspect of the present disclosure, FIG. 2 shows an aircraft 20 comprising a galley section 22, shown in cutaway fashion, with galley section 22 comprising a flooring assembly highlighted further in FIGS. 4, 5 and 6.

FIG. 3 shows an internal view of the galley section 22 of FIG. 2 comprising an exposed floor 24. While the exposed floor 24 is shown comprising a plurality of flooring units 24a, it is understood that an exposed floor, for example, in an aircraft galley or other object can comprise a unitary structure, according to aspects of the present disclosure.

FIG. 4 shows a further view of the galley section 22 of FIGS. 2 and 3. As shown in FIG. 4, a material layer 26 having an upper surface and a lower surface (not visible in FIG. 4) suspended above the exposed floor 24, awaiting to be lowered onto, or otherwise applied to rest immediately proximate to exposed floor section 24.

FIG. 5 shows another view of the galley section 22 of FIGS. 2, 3 and 4. As shown in FIG. 5, the material layer 26 is oriented in position to rest on, or is otherwise applied to and adhered to floor section 24. Material layer lower surface 26a, otherwise referred to equivalently herein as the material layer underside, is shown being oriented or otherwise applied to the exposed floor 24, with the material layer lower surface 26a comprising an adhesive.

FIG. 6 shows another view of the galley section 22 of FIGS. 2, 3, 4 and 5. As shown in FIG. 6, material layer has now been installed to complete a flooring assembly such that material layer 26 is oriented onto, or is otherwise applied to and is in position covering the previously exposed floor 24.

EXAMPLES

Adhesion-regulating agents were made according to the following protocols and concentrations. Baseline adhesion values (e.g., "control" values) were obtained for the adhesion of a galley mat comprising a pressure sensitive adhesive adhered to a cleaned substrate. The terms "baseline" and "control" are used equivalently and interchangeably herein. The baseline values were obtained for comparison by, in a two-step regimen, cleaning a substrate surface by wiping the substrate surface in a first step with methyl propyl ketone (MPK), drying at ambient temperature by wiping, followed by wiping the substrate surface in a second step with isopropyl alcohol (IPA). A galley mat comprising a pressure sensitive adhesive was then applied to the substrate surface with the pressure sensitive adhesive of the galley mat oriented proximate to the substrate surface. For the comparative testing (e.g., comparing values obtained using the adhesion-regulating agents according to aspects of the present disclosure to the baseline values of the control substrates), the adhesion-regulating agents according to aspects of the present disclosure are listed in the Tables below.

Example 1

Adhesion-regulating agents of different concentrations were formed by doping methyl propyl ketone (MPK-Ashland) solvent samples containing about 95% to about 99% by volume, or isopropyl alcohol (IPA-Ashland) with differing amounts of titanium (IV) butoxide (Sigma Aldrich). Varying amounts of titanium (IV) butoxide were added dropwise via pipette to the MPK and/or IPA solutions, as noted below. For example, a 0.5% adhesion-regulating agent solution was made by mixing the following components and amounts: MPK (99.5 ml) with titanium (IV) butoxide (0.5 ml, added dropwise). A 0.3% adhesion-regulating agent solution was made by mixing the following components and amounts: MPK (99.7 ml) with titanium (IV) butoxide (0.3 ml, added dropwise). A 0.15% adhesion-regulating agent solution was made by mixing the following components and amounts: MPK (99.85 ml) with titanium(IV) butoxide (0.15 ml, added dropwise).

Example 2

To obtain baseline adhesion values for purposes of obtaining a "control" value for comparison, substrate samples comprising: 1) carbon fiber-reinforced plastic (CFRP); 2) CFRP coated with polyurethane tape; and 3) titanium were treated first with a baseline cleaning regimen comprising a first cleaning of the substrate surface with MPK, followed by a second cleaning of the substrate surface with IPA. The substrate surfaces were then covered by a galley mat comprising a pressure sensitive adhesive made from a tacky acrylic adhesive polymer. The pressure sensitive adhesive was substantially uniformly present on the underside of the galley mat, with the underside of the mat understood to be the surface of the mat brought into contact with and otherwise oriented proximate to the cleaned substrate surface. The galley mat comprised a silicone or vinyl material. The mat was oriented into place on the exposed and baseline-cleaned substrate surface. ASTM D6862-90 degree peel testing was performed to determine the amount of force that was required to remove the mat from the substrate surface and baseline (e.g., "control") values were obtained in pounds per inch of width (PIW).

Example 3

Substrate samples comprising: 1) carbon fiber-reinforced plastic (CFRP); 2) CFRP coated with polyurethane tape; and 3) titanium were treated with adhesion-regulating agents made according to the regimen set forth in Example 1 with the substrate samples subjected to an adhesion-regulating treatment regimen comprising first applying an amount of MPK fortified with titanium (IV) butoxide to the substrate surface by wiping. The substrate surface was wiped dry, and an amount of IPA was then applied to the substrate surface by wiping. The substrate surfaces were then covered by a galley mat comprising a pressure sensitive adhesive made from a tacky acrylic adhesive polymer in a similar fashion as compared to the galley mat-orienting process described in Example 2. The pressure sensitive adhesive was substantially uniformly present on the underside of the galley mat; with the underside of the mat understood to be the surface of the mat brought into contact with the cleaned substrate surface. The galley mat comprised a silicone or vinyl material. The mat was oriented into place on the exposed substrate surfaces treated with the adhesion-regulating agents. ASTM D6862-90 degree peel testing was performed to determine the amount of force required to remove the mat from the substrate surface in pounds per inch of width (PIW). Table 1 shows a comparison of the peel strengths on the CFRP substrate sample with differing levels of titanium (IV) butoxide present in the MPK mixture (e.g., varying % doping of MPK with titanium (IV) butoxide), and differing levels of titanium (IV) butoxide present in the IPA mixture (e.g., varying % doping of a mixture of 1:1 IPA:naphtha with titanium (IV) butoxide). As shown in Table 1, the substrate samples treated with the MPK adhesion-regulating agent and the IPA mixture adhesion-regulating agent realized an increase in peel strength (PIW). More specifically, an adhesion-regulating agent comprising a 0.15% titanium (IV) butoxide-doped MPK exhibited a 10% increase in PIW. An adhesion-regulating agent comprising a 0.30% titanium (IV) butoxide-doped MPK exhibited a 24% increase in PIW. An adhesion-regulating agent comprising a 0.50% titanium (IV) butoxide-doped MPK exhibited a 25% increase in PIW.

TABLE 1

| Doping level (%) of titanium (IV) butoxide | Peel Strength (PIW) Undoped - Control | Peel Strength (PIW) Doped | % Increase in PIW |
|---|---|---|---|
| 0.15 | 1.52 | 1.78 | 10 |
| 0.30 | 1.48 | 2.00 | 24 |
| 0.50 | 1.46 | 2.04 | 25 |

Example 4

Data was obtained using ASTM D-6862-90 as described in Example 3 for various substrates treated with adhesion-regulating agents disclosed herein, with obtained PIW values compared to obtained control, or "baseline" PIW values after testing conducted on substrates conventionally cleaned. The baseline/cleaning regimen for the "control" comprised wiping the substrate surface first with methyl propyl ketone (MPK), followed by wiping the substrate surface with isopropyl alcohol (IPA). The adhesion-regulating agent applied to the selected substrate for testing was a two-step process. First, a mixture of methyl propyl ketone (MPK) doped with about 0.3% by volume of titanium (IV) butoxide was applied the substrate surface by wiping, followed (after wiping dry) by applying a 1:1 mixture of IPA:naphtha doped with an amount of about 0.3% by volume of titanium (IV) butoxide. The same regimen relative to adhering galley mats to the cleaned or adhesion-treated substrate samples described in Example 3 was conducted in this Example 4. Table 2 below shows results of the values obtained. Once again, the samples treated with the adhesion-regulating treatment exhibited an observed adhesion increase.

TABLE 2

| Substrate | Baseline Cleaning (Control") or Adhesion-Regulating Treatment | PIW (pounds per inch of width)- Avg. |
|---|---|---|
| CRFP | Baseline/Cleaning only - "Control" | 1.36 |
| CFRP | Adhesion-Reg. Treatment | 1.69 |
| Polyurethane-coated (tape) CFRP | Baseline/Cleaning Only - "Control" | 1.42 |

TABLE 2-continued

| Substrate | Baseline Cleaning (Control") or Adhesion-Regulating Treatment | PIW (pounds per inch of width)- Avg. |
|---|---|---|
| Polyurethane-coated (tape) CFRP | Adhesion-Reg. Treatment | 1.71 |
| Titanium | Baseline/Cleaning Only - "Control" | 1.68 |
| Titanium | Adhesion-Reg. Treatment | 2.01 |

Example 5

Data was obtained using ASTM D-6862-90 as described in Example 3 for various substrates treated with adhesion-regulating agents disclosed herein, with obtained PIW values compared to obtained control, or "baseline" PIW testing on substrates conventionally cleaned. The baseline/cleaning regimen comprised wiping the substrate surface first with methyl propyl ketone (MPK), followed by wiping the substrate surface with isopropyl alcohol (IPA). The adhesion-regulating agent applied to the selected substrates for testing was a two-step process. First, a mixture of methyl propyl ketone (MPK-about 99% by volume) doped with 0.1% by volume of titanium (IV) butoxide was applied by wiping to the test substrate surface, followed by wiping the sample substrate surface dry, and then applying an amount of IPA to the sample substrate surface by wiping. The same regimen relative to adhering galley mats to the cleaned or adhesion-treated substrate samples described in Examples 3 and 4 was conducted in this Example 5. Table 3 below shows results of the values obtained. Once again, the samples treated with the adhesion-regulating treatment exhibited an observed adhesion increase.

TABLE 3

| Substrate | Baseline Cleaning or Adhesion-Regulating Treatment | PIW (pounds per inch of width)- Avg. |
|---|---|---|
| CRFP | Baseline/Cleaning only - "Control" | 1.45 |
| CFRP | Adhesion-Reg. Treatment | 1.60 |
| Polyurethane-coated (tape) CFRP | Baseline/Cleaning Only - "Control" | 1.42 |
| Polyurethane-coated (tape) CFRP | Adhesion-Reg. Treatment | 2.09 |
| Titanium | Baseline/Cleaning Only- "Control" | 1.46 |
| Titanium | Adhesion-Reg. Treatment | 1.77 |

Example 6

Data was obtained using ASTM D-6862-90 as described in Example 3 for various substrates treated with adhesion-regulating agents disclosed herein, with obtained PIW values compared to obtained control, or "baseline" PIW testing on substrates conventionally cleaned. The baseline/cleaning regimen comprised wiping the substrate surface first with methyl propyl ketone (MPK), followed by wiping the substrate surface with isopropyl alcohol (IPA). The adhesion-regulating agent applied to the selected substrate for testing was a two-step process. Methyl propyl ketone (MPK) was applied by wiping to the substrate surface, wiped dry, and followed by applying a mixture of IPA doped with about 0.3% by volume of titanium (IV) butoxide to the substrate surface by wiping. The same regimen relative to adhering galley mats to the cleaned or adhesion-treated substrate samples described in Example 3, 4 and 5 was conducted in this Example 6. Table 4 below shows results of the values obtained. Once again, the samples treated with the adhesion-regulating treatment exhibited an observed adhesion increase.

TABLE 4

| Substrate | Baseline Cleaning or Adhesion-Regulating Treatment | PIW (pounds per inch of width)- Avg. |
| --- | --- | --- |
| CFRP | Baseline/Cleaning only - "Control" | 1.74 |
| CFRP | Adhesion-Reg. Treatment | 2.20 |
| Polyurethane-coated (tape) CFRP | Baseline/Cleaning Only - "Control" | 1.05 |
| Polyurethane-coated (tape) CFRP | Adhesion-Reg. Treatment | 2.22 |
| Titanium | Baseline/Cleaning Only- "Control" | 1.55 |
| Titanium | Adhesion-Reg. Treatment | 2.39 |

As shown in Tables 2, 3 and 4, for the substrates treated with the adhesion-regulating agent, such substrates were observed to have a significantly increased adhesion value (expressed in terms of PIW), as compared to the observed PIW adhesion value observed for the "control" substrates receiving only baseline or conventional cleaning (e.g., no treatment with the adhesion-regulating agents of the present disclosure).

Example 7

Using ASTM D-6862-90 as described in Example 3, various substrates (e.g. CFRP, polyurethane-coated CFRP, and titanium) are treated with adhesion-regulating agents disclosed herein. PIW values are obtained and compared to control, or "baseline" PIW testing on substrates conventionally cleaned. The baseline/cleaning regimen comprises wiping the substrate surface first with methyl ethyl ketone (MEK), followed by wiping the substrate surface with isopropyl alcohol (IPA). The adhesion-regulating agent is applied to the selected substrate for testing as a two-step process. Methyl ethyl ketone (MEK) doped with 0.3% by volume of titanium (IV) 2-ethylhexyloxide is applied the substrate surface by wiping, followed (after wiping dry) by applying IPA to the substrate surface by wiping. The same regimen relative to adhering galley mats to the cleaned or adhesion-treated substrate samples described in Example 3, 4, 5 and 6 is conducted in this Example 7. See Table 5.

TABLE 5

| Substrate | Baseline Cleaning or Adhesion-Regulating Agent Treatment (ARAT) | |
| --- | --- | --- |
| | Step 1 | Step 2 |
| CFRP-Control | MEK | IPA |
| CFRP-ARAT | MEK + titanium (IV) 2-ethylhexyloxide | IPA |
| Polyurethane- Coated (tape) CFRP-Control | MEK | IPA |
| Polyurethane- Coated (tape) CRFP ARAT | MEK + titanium (IV) 2-ethylhexyloxide | IPA |

TABLE 5-continued

| Substrate | Baseline Cleaning or Adhesion-Regulating Agent Treatment (ARAT) | |
| --- | --- | --- |
| | Step 1 | Step 2 |
| Titanium - Control | MEK | IPA |
| Titanium - ARAT | MEK + titanium (IV) 2-ethylhexyloxide | IPA |

Without being bound to any particular theory, according to aspects of the present disclosure, it is believed that the presently-disclosed adhesion-regulating agents undergo a chemical conversion to induce surface roughness to the substrate to which a material layer is being adhered. particularly preferred adhesion-regulating agents comprise an amount of at least one of titanium (IV) (triethanolaminato) isopropoxide; titanium bis(triethanolamine) diisopropoxide; titanium (IV) butoxide polymer; titanium (IV) butoxide; titanium (IV) oxyacetylacetonate; titanium (IV) bis(ammonium lactate)dihydroxide; oxobis(2,2,6,6-tetramethyl-3,5-heptanedianato) titanium(IV); titanium (IV diisopropoxidebis(2,2,6,6-tetramethyl-3,5-heptanedionate); titanium (IV) diisopropoxide bis(acetylacetonate); titanium (IV) tert-butoxide; titanium tetraisopropoxide; or titanium (IV) 2-ethylhexyloxide.

As described above, according to aspects of the present disclosure, the adhesion-regulating agents serve to increase adhesion of the pressure-sensitive adhesives to a predetermined degree based on the doping of the ketonic solvent with the titanate-containing compound. However, and importantly, according to further aspects, when desired adhesive requirements necessitate facile removal of a material layer containing an adhesive from a substrate, or facile removal and/or reapplication of a material layer containing an adhesive to from and to a substrate, the adhesion of the adhesive must be regulated to not exceed a particular PIW value. For example, with the particular example of an aircraft galley mat, comprising an adhesive, the mat must adhere to a floor substrate to become a finished flooring assembly. Further, the galley mat must adhere to the floor substrate to a degree where no separation of the galley mat from the floor substrate occurs (e.g., bubbling). However, the useful life of the galley mats on, for example, aircraft is significantly extended if the galley mats can be placed onto a floor location initially, adhere to a degree where the galley mat experiences no separation from the floor (e.g., no "bubbling" occurs), and then be removed from the floor substrate without damage to the mat or the substrate, and then be reapplied to the floor substrate or repositioned on the floor substrate in a new location (e.g. different from the initial installation), and again adhere to a degree where the galley mat experiences no separation from the floor (e.g., no "bubbling" occurs).

Example 8

Experiments were conducted to determine the impact of the adhesion-regulating agents on a pressure sensitive adhesive of a galley mat adhered to various substrates, relative to the PIW values obtained when the galley mat adhered to a floor substrate to a predetermined degree of adherence (e.g., and having an initial or "original" PIW value) is removed from the floor substrate, repositioned and removed a first time (e.g. a first repositioning PIW value), and then removed from the floor substrate a second time (e.g. second repositioning PIW value). Table 6 shows the PIW values recorded for galley mats applied to, removed from and repositioned twice on or from a substrate treated with the adhesion-regulating agents of the present disclosure. The baseline/cleaning regimen for the "control" comprised wiping the substrate surface first with methyl propyl ketone (MPK), followed by wiping the substrate surface with isopropyl alcohol (IPA). The adhesion-regulating agent applied to the selected substrate for testing was a two-step process. First, a mixture of methyl propyl ketone (MPK) doped with 0.3% by volume of titanium (IV) butoxide (shown as "titanate" in Table 6) was applied the substrate surface by wiping, followed (after wiping dry) by applying a 1:1 mixture of IPA:naphtha doped with an amount of about 0.3% by volume of titanium (IV) butoxide.

TABLE 6

| Substrate | Baseline Cleaning or Adhesion-Regulating Agent Treatment (ARAT) | | PIW Original | PIW $1^{st}$ Removal and Repositioning | PIW $2^{nd}$ Removal | Average PIW |
| --- | --- | --- | --- | --- | --- | --- |
| | Step 1 | Step 2 | | | | |
| CFRP - Baseline | MPK | IPA | 1.48 | 1.32 | 1.29 | 1.36 |
| CFRP - ARAT | MPK + titanate | MPK + IPA + titanate | 2.00 | 1.57 | 1.50 | 1.69 |
| Polyurethane-Coated (tape) CFRP - Baseline | MPK | IPA | 1.30 | 1.41 | 1.55 | 1.42 |
| Polyurethane-Coated (tape) CRFP - ARAT | MPK + titanate | MPK + IPA + titanate | 1.96 | 1.62 | 1.54 | 1.71 |
| Titanium - Baseline | MPK | IPA | 1.93 | 1.51 | 1.52 | 1.66 |
| Titanium - ARAT | MPK + titanate | MPK + IPA + titanate | 2.38 | 1.87 | 1.78 | 2.01 |

As shown in Table 6, when the disclosed adhesion-regulating agents are applied to treat a substrate surface during the Adhesion-Regulating Agent Treatment (ARAT in Table 6), the adhesion-regulating agents alter (e.g., increase) to a predetermined degree the adhesion of the pressure sensitive adhesive present on the underside of a galley mat that is brought into contact with and otherwise positioned or oriented on the substrate surface. Regardless of the substrate tested, (e.g., substrates formed from CFRP, CRFP coated with polyurethane tape, titanium), the adhesion of the pressure sensitive adhesive to the substrate was increased. Further, the PIW value of the adhesion of the pressure sensitive adhesive remained higher for the substrates treated with the adhesion-regulating agents as compared to equivalent substrates that were only conventionally cleaned; even when the galley mat comprising the pressure sensitive adhesive was removed from the substrate, and reapplied (e.g., repositioned) onto the substrate.

While adhesives of varying strength can be used to adhere an object, such as, for example a galley mat to a substrate, such as a vehicle floor, certain applications require that the adhesion observe at least two important characteristics: 1) adequate adhesion to avoid premature slippage, or disengagement of the adhered object from the substrate (e.g., disengagement that can result in complete separation, or partial separation of at least a portion of the object from the substrate known as "bubbling"); and 2) a predetermined degree of adhesion represented by a PIW value that ranges between about 1 PIW and about 4 PIW, and preferably ranges from about 1 PIW to about 2 PIW, to ensure that the object being adhered can be removed and repositioned or otherwise reused without incurring damage to either the substrate, or the object being adhered to and removed from the substrate.

If desired, the adhesion-regulating agents of the present disclosure can comprise a preselected amount of titanate-containing compound for the purpose of increasing adhesion of an adhesive to a desired and preselected degree. That is, adhesion characteristics of a selected adhesive can be enhanced to a desired and preselected degree. Such tailoring of known adhesive or commercially available adhesives greatly widens the usefulness of such adhesives, potentially beyond the intended use of such adhesives. In other words, rather than stocking a multitude of adhesives based on their intended use (e.g., relative to the stated adhesion of a particular adhesive), adhesives may be tuned to selectively increase their adhesion characteristics by treating surfaces to which objects are to be adhered through the use of the adhesion-regulating methods and adhesion-regulating agents disclosed herein.

The adhesion-regulating agents disclosed herein have particular utility for increasing and otherwise regulating the adhesion values of acrylic adhesive, including pressure sensitive adhesives, such as those of the type applied to flexible objects such as mats and in particular galley mats. The present disclosure therefore further contemplates the use of the adhesion-regulating agents on substrates intended to be covered by objects such as mats including galley mats including those galley mats used in the floor assemblies of stationary objects and structures, including, for example buildings, as well as mobile objects, including, for example, vehicles. Contemplated vehicles include manned and unmanned aircraft, manned and unmanned spacecraft, manned and unmanned rotorcraft, manned and unmanned terrestrial vehicles, manned and unmanned surface water borne vehicles, and manned and unmanned sub-surface water borne vehicles.

Aspects of the present disclosure can, of course, be carried out in other ways than those specifically set forth herein without departing from essential characteristics of aspects disclosed herein. The presently disclosed aspects are to be considered in all respects as illustrative and not restrictive, and all changes coming within the meaning and equivalency range of the appended claims are intended to be embraced therein.

What is claimed is:

1. A flooring assembly comprising:
a floor substrate having a floor substrate surface, said floor substrate surface treated with an adhesion-regulating agent to form an adhesion-regulated floor substrate surface, said adhesion-regulating agent comprising:
a titanate-doped ketone mixture comprising:
an amount of ketone ranging from about 95% to about 99% by volume, said ketone selected from at least one of: methyl ethyl ketone; methyl n-propyl ketone; methyl isobutyl ketone; and acetone; and
a titanate in an amount ranging from about 0.05% to about 5% by volume;
a flooring material, said flooring material comprising a pressure sensitive adhesive layer, said pressure sensitive adhesive layer configured to be oriented proximate to the adhesion-regulated floor substrate surface;
wherein the flooring material maintains a degree of adhesion to the adhesion-regulated floor substrate surface, with the degree of adhesion ranging from between about 1.0 pound per inch of width to about 4 pounds per inch of width.

2. The flooring assembly of claim 1, wherein the floor substrate surface comprises at least one of: a carbon fiber-reinforced plastic; a coated carbon fiber-reinforced plastic; titanium; a titanium alloy, aluminum, and an aluminum alloy.

3. The flooring assembly of claim 1, wherein the titanate comprises at least one of:
titanium (IV) (triethanolaminato)isopropoxide; titanium bis(triethanolamine)diisopropoxide; titanium (IV) butoxide polymer; titanium (IV) butoxide; titanium (IV) oxyacetylacetonate; titanium (IV) bis(ammonium lactate)dihydroxide; oxobis(2,2,6,6-tetramethyl-3,5-heptanedianato) titanium (IV); titanium (IV) diisopropoxidebis(2,2,6,6-tetramethyl-3,5-heptanedionate); titanium (IV) diisopropoxide bis(acetylacetonate); titanium (IV) tert-butoxide; titanium tetraisopropoxide; and titanium (IV) 2-ethylhexyloxide.

4. The flooring assembly of claim 1, wherein the adhesion-regulating agent increases the degree of adhesion by an amount ranging from between about 10% to about 25% as compared to the degree of adhesion of the flooring material comprising the pressure sensitive adhesive layer to the floor substrate surface that is not surface treated with the adhesion-regulating agent.

5. The flooring assembly of claim 1, wherein the flooring material is removable from the floor substrate surface without damaging the flooring material and without damaging the floor substrate surface.

6. The flooring assembly of claim 1, wherein the floor substrate surface comprises at least one of: a metal, a metal alloy, a carbon fiber-reinforced plastic, a carbon fiber-reinforced plastic coated with polyurethane tape, and a coated metal.

7. The flooring assembly of claim 1, wherein the ketone is selected from at least one of: methyl ethyl ketone, methyl n-propyl ketone, and acetone.

8. The flooring assembly of claim 1, wherein the flooring material comprises at least one of: a silicone material and a vinyl material.

9. A vehicle comprising the flooring assembly of claim 1, wherein the vehicle is:
a manned aircraft, an unmanned aircraft, a manned spacecraft, an unmanned spacecraft, a manned rotorcraft, an unmanned rotorcraft, a satellite, a manned terrestrial vehicle, an unmanned terrestrial vehicle, a manned surface water borne vehicle, an unmanned surface water borne vehicle, a manned sub-surface water borne vehicle, or an unmanned sub-surface water borne vehicle.

10. A building comprising the flooring assembly of claim 1.

11. A method comprising:
applying an adhesion-regulating agent to a floor substrate surface to form an adhesion-regulated floor substrate surface, said adhesion-regulating agent comprising:
a titanate-doped ketone mixture comprising:
an amount of ketone ranging from about 95% to about 99% by volume, said ketone selected from the group consisting of methyl ethyl ketone; methyl n-propyl ketone; methyl isobutyl ketone; and acetone; and
a titanate in an amount ranging from about 0.05% to about 5% by volume;
placing a flooring material onto the adhesion-regulated floor substrate surface, said flooring material comprising an adhesive layer, said adhesive layer oriented proximate to the adhesion-regulated floor substrate surface; and
maintaining a degree of adhesion between the flooring material and adhesion-regulated floor substrate surface, with the degree of adhesion ranging from between about 1.0 pound per inch of width to about 4 pounds per inch of width.

12. The method of claim 11, wherein the flooring material is removable from the floor substrate surface without damaging the flooring material and without damaging the floor substrate surface.

13. The method of claim 11, wherein the adhesion-regulating agent increases the degree of adhesion by an amount ranging from between about 10% to about 25% as compared to the degree of adhesion of the flooring material comprising the adhesive layer to the floor substrate surface with the adhesion-regulating agent not applied.

14. The method of claim 11, wherein said titanate comprises at least one of:
titanium (IV) (triethanolaminato)isopropoxide; titanium bis(triethanolamine)diisopropoxide; titanium (IV) butoxide polymer; titanium (IV) butoxide; titanium (IV) oxyacetylacetonate; titanium (IV) bis(ammonium lactate)dihydroxide; oxobis(2,2,6,6-tetramethyl-3,5-heptanedianato) titanium (IV); titanium (IV) diisopropoxidebis(2,2,6,6-tetramethyl-3,5-heptanedionate); titanium (IV) diisopropoxide bis(acetylacetonate); titanium (IV) tert-butoxide; titanium tetraisopropoxide; and titanium (IV) 2-ethylhexyloxide.

15. The method of claim 11, wherein the floor substrate surface comprises at least one of: a metal, a metal alloy, a carbon fiber-reinforced plastic, a carbon fiber-reinforced plastic coated with polyurethane tape, and a coated metal.

16. The method of claim 11, wherein the ketone containing the ketone is selected from the group consisting of: methyl ethyl ketone, methyl n-propyl ketone, methyl isobutyl ketone, and acetone.

17. The method of claim 11, wherein the flooring material layer comprises at least one of: a silicone material or a vinyl material.

18. A flooring assembly installed according to the method of claim 11.

19. A vehicle comprising the flooring assembly of claim 18.

20. The vehicle of claim 19, wherein the vehicle is a manned aircraft, an unmanned aircraft, a manned spacecraft, an unmanned spacecraft, a manned rotorcraft, an unmanned rotorcraft, a satellite, a manned terrestrial vehicle, an unmanned terrestrial vehicle, a manned surface water borne vehicle, an unmanned surface water borne vehicle, a manned sub-surface water borne vehicle, or an unmanned sub-surface water borne vehicle.

\* \* \* \* \*